(12) United States Patent
Donlagic et al.

(10) Patent No.: US 8,557,129 B2
(45) Date of Patent: Oct. 15, 2013

(54) METHODS OF MANUFACTURING OPTICAL DEVICES

(75) Inventors: Denis Donlagic, Maribor (SI); Simon Pevec, Podcetrtek (SI)

(73) Assignee: University of Maribor, Maribor (SI)

( * ) Notice: Subject to any disclaimer, the term of this patent is extended or adjusted under 35 U.S.C. 154(b) by 233 days.

(21) Appl. No.: 13/046,659

(22) Filed: Mar. 11, 2011

(65) Prior Publication Data
US 2012/0228259 A1    Sep. 13, 2012

(51) Int. Cl.
*B29D 11/00* (2006.01)
*G02B 6/00* (2006.01)

(52) U.S. Cl.
USPC .............................. 216/24; 385/13; 385/123

(58) Field of Classification Search
USPC ....................... 216/24; 385/13, 123
See application file for complete search history.

(56) References Cited

U.S. PATENT DOCUMENTS

| | | | |
|---|---|---|---|
| 4,684,215 A | 8/1987 | Shaw et al. | |
| 5,202,939 A | 4/1993 | Belleville et al. | |
| 5,394,500 A * | 2/1995 | Marchman | 385/123 |
| 6,539,136 B1 | 3/2003 | Dianov et al. | |
| 6,567,173 B1 | 5/2003 | Johannesen | |
| 6,925,213 B2 | 8/2005 | Boyd et al. | |
| 7,054,011 B2 | 5/2006 | Zhu et al. | |
| 7,474,821 B2 | 1/2009 | Donlagic et al. | |
| 7,684,657 B2 | 3/2010 | Donlagic et al. | |
| 2004/0223679 A1 | 11/2004 | Pickrell et al. | |
| 2005/0062979 A1 * | 3/2005 | Zhu et al. | 356/480 |
| 2008/0159687 A1 | 7/2008 | Donlagic et al. | |
| 2009/0226128 A1 * | 9/2009 | Donlagic et al. | 385/13 |

FOREIGN PATENT DOCUMENTS

EP    0 430 532    6/1991

OTHER PUBLICATIONS

Li et al."Deep ultraviolet laser micromachining of novel fibre optic devices", Journal of Physics: Conference Series 59, 2007, pp. 691-695.
Durr et al. "Hydrogen loading and UV-irradiation induced etch rate changes in phosphorus-doped fibers", Optics Express, Nov. 2004, vol. 12, No. 23, pp. 5770-5776.
Donlagic et al., U.S. Appl. No. 12/758,738, filed Apr. 12, 2010.
Donlagic et al., U.S. Appl. No. 13/046,648, filed Mar. 11, 2011.
Donlagic, U.S. Appl. No. 13/046,666, filed Mar. 11, 2011.

* cited by examiner

*Primary Examiner* — Nadine G Norton
*Assistant Examiner* — Mahmoud Dahimene
(74) *Attorney, Agent, or Firm* — Dugan & Dugan, PC

(57) ABSTRACT

Methods of manufacturing optical devices are disclosed. The method includes providing a structure-forming fiber bonded to at least one other optical component, the structure-forming fiber having a preferentially-etchable portion including at least one radial etching boundary and at least one axial etching boundary, and etching the preferentially-etchable portion to the radial and axial etching boundaries to produce a precise optical structure. The preferentially-etchable portion may be removed through one or more radial openings in the structure-forming fiber. Numerous other aspects are provided.

19 Claims, 16 Drawing Sheets

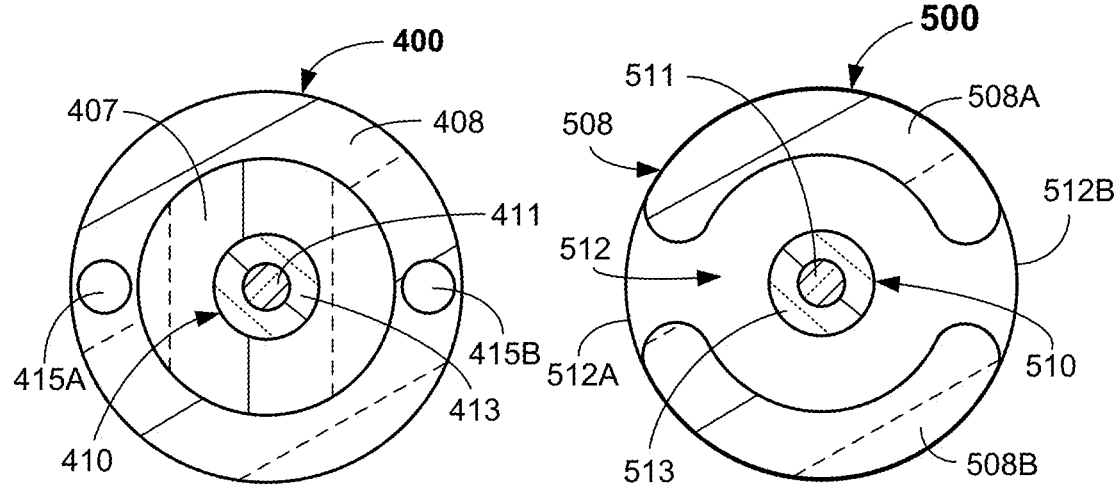
*FIG. 4*  *FIG. 5A*
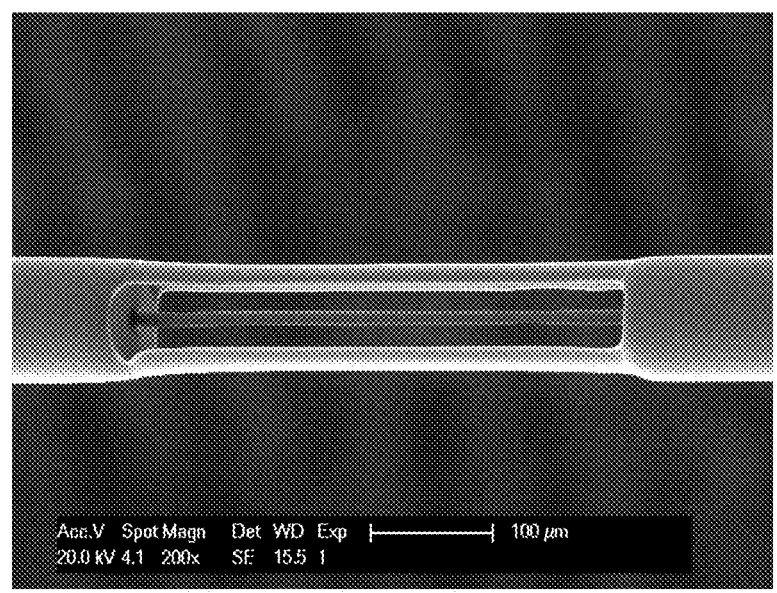
*FIG. 5B*

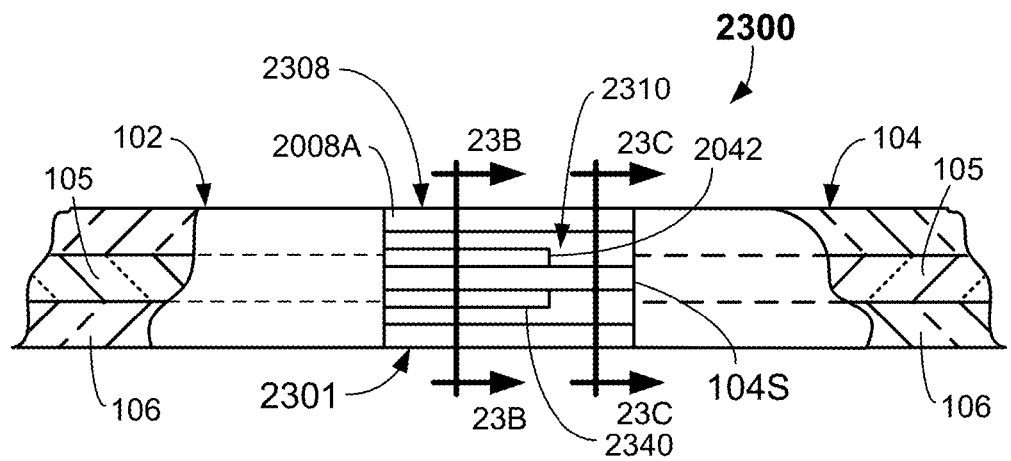
FIG. 23A
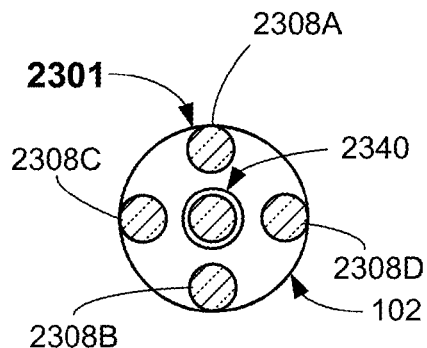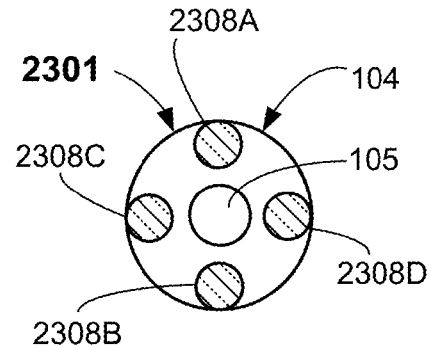
FIG. 23B    FIG. 23C
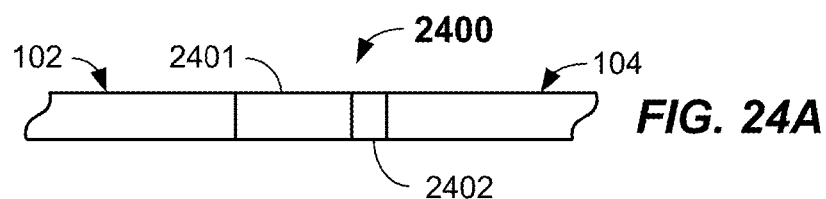
FIG. 24A

METHODS OF MANUFACTURING OPTICAL DEVICES

FIELD OF THE INVENTION

The present invention relates to methods adapted for manufacturing of optical devices, and more particularly to micromachining of optical fibers.

BACKGROUND OF THE INVENTION

Optical components may be used in various applications due to their unique properties, such as small size, dielectric structure, electromagnetic immunity, robustness, chemical durability, high sensitivity, and cylindrical geometry. These properties make optical devices especially suitable for applications in extreme environments, telecommunication, biomedical applications, and in all fields of industrial applications.

Some devices may include micro- and nanometer-scale devices and may be manufactured using micromachining techniques. For example, optical fiber ends may be micromachined to form precision lens shapes by the use of lasers (e.g., $CO_2$ or ultra short laser pulses), as described in EP0430532. In other applications, diffraction gratings may be machined on an end of an optical fiber by the use of ultraviolet laser micromachining, as described in the paper entitled "Deep ultraviolet laser micromachining of novel fibre optic devices", Journal of Physics: Conference Series 59, 691-695, (2007) by Li et al. However, laser micromachining processes may have certain limitations. The geometry of formed microstructure that may be produced may be quite limited. More importantly, in order to machine a fiber by a laser beam, each fiber must be individually positioned and aligned on a micrometer scale before the processing by laser beam may commence. Accordingly, this is a very time consuming process that limits productivity and thereby cost efficiency.

Therefore, there is a long felt and unmet need for manufacturing methods that result in highly effective optical devices that may be accomplished cost effectively.

SUMMARY OF THE INVENTION

In one aspect, a method of manufacturing an optical device is provided. The method includes providing a structure-forming fiber bonded to at least one other optical component, the structure-forming fiber having a preferentially-etchable portion; and etching the preferentially-etchable portion to at least one radial etching boundary and at least one axial etching boundaries to produce an optical structure.

In another aspect, a method of manufacturing an optical device is provided. The method includes providing a structure-forming member including a preferentially-etchable portion, a radial etching boundary and an axial etching boundary; and etching the structure-forming member with an etching medium to remove the preferentially-etchable portion to the radial and axial etching boundary through one or more radial openings in the structure-forming member.

In another method aspect, a method of manufacturing an optical device is provided. The method includes providing a structure-forming fiber bonded to a first optical component on a first end and a second optical component on a second end, the structure-forming fiber having a preferentially-etchable portion, the structure-forming fiber including at least one radial etching boundary comprising a structure-forming portion, and at least two axial etching boundaries at the first and second optical components; and etching the preferentially-etchable portion to the at least one radial etching boundary and the at least two axial etching boundaries to produce an optical structure.

Numerous other aspects are provided in accordance with these and other aspects of the invention. Other features and aspects of the present invention will become more fully apparent from the following detailed description, the appended claims, and the accompanying drawings.

BRIEF DESCRIPTION OF THE DRAWINGS

FIG. 4 is a cross sectioned end view of a structure of an alternative structure-forming fiber.

FIG. 5A is a cross sectioned end view of an optical device produced following the etching of the structure-forming fiber of FIG. 4.

FIG. 5B is a micrograph view of an optical device produced following the etching of the structure-forming fiber of FIG. 4.

FIGS. 23A-23C are side and cross sectioned end views of an alternate embodiment of optical device manufactured in accordance with the present method.

FIG. 24A is a side plan view of a bonded assembly used to manufacture an optical device of FIG. 23A in accordance with the present method.

DETAILED DESCRIPTION

Figure 1A:
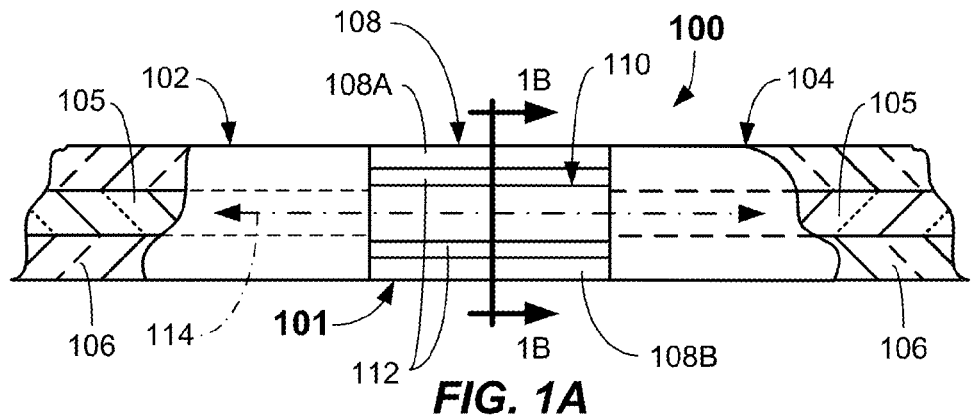
FIG. 1A is a schematic diagram of an optical device manufactured according to a method of the present invention.

Photonic systems and devices have gained considerable importance over past decades as they proved to be enabling technologies for modern telecommunications, advanced medical applications, data storage and processing, manufacturing, measurement and monitoring technology, etc. While different types of lithography technologies, originally developed by microelectronics industry, may be applied to optoelectronic device design and manufacturing, they are not ideally suited to machining of optical fibers due to the fiber's cylindrical geometry. Furthermore, effective lithographic procedures cannot readily be applied for batch processing of large number of optical fibers.

Effective reshaping and reforming of a structure of an optical fiber into a functional photonic or optical assembly is, therefore, desired for the creation of micro-photonic devices. Such devices may include, for example, telecommunication devices, in-line optical devices, optical sensors, fiber lasers, and fiber biomedical devices. Effective micromachining technologies for reshaping the structure of an optical fiber are needed, so as to considerably reduce the cost of manufacture.

According to embodiments of the invention, micromachining methods are provided for effective and economical reshaping of a structure of a silica-based, structure-forming fiber into an optical device having complex three-dimensional structure. The methods of the present invention enable manufacturing of such complex structures by providing a preferentially-etchable portion in a structure-forming fiber and by providing etching boundaries to essentially limit an extent of etching. The methods of the invention may allow rapid formation of relatively deep or complex relief microstructures on or in a fiber structure, while also providing well defined geometry. The present method may be accomplished by the use of preferentially-etchable portion together with the use of axial and radial etching boundaries as will be described further herein. In accordance with another aspect, the present invention may allow excellent control over fiber etching rate, and the disclosed methods may therefore allow for precise control over a refractive index of the resultant etched fiber. This may permit creation of photonic structures with relatively higher complexity.

In some embodiments, the manufacturing method of the present invention may be carried out on large batches, and, thus, presents a technology advancement that may be cost effective and suitable for mass production. In accordance with an aspect of the invention, structure-forming fibers with proper composition and refractive index profile can be cut in short lengths, bonded to at least one other optical component (e.g., a conventional optical fiber), and then etched in large batches. This enables manufacture of a relatively large number of structures or devices without the need for individual handling of each fiber. In some aspects, the structure-forming fibers may be bonded between multiple optical components to provide multiple etching boundaries.

According to a first aspect, a method of manufacturing an optical device is provided. The method includes providing a structure-forming fiber coupled to at least one other optical component such as an optical fiber having a core and cladding, the structure-forming fiber having a preferentially-etchable portion, the structure-forming fiber including at least one radial etching boundary and at least one axial etching boundary, and etching the preferentially-etchable portion to the radial and axial etching boundaries. This may be used to rapidly produce a photonic or optical structure having precise dimensions and a desired shape in the optical device.

According to another aspect, a method of manufacturing an optical device is provided. The method includes providing a structure-forming fiber including a preferentially-etchable portion, and etching the structure-forming fiber to remove at least a portion of the preferentially-etchable portion through one or more radial openings in the structure-forming fiber to form an optical device.

These and other embodiments of the present invention are further described with reference to FIGS. 1A-25 below.

Figure 1B:
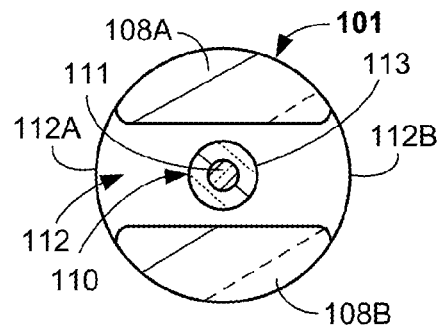
FIG. 1B is a cross-sectional end view of an optical device of FIG. 1A taken along section line 1B-1B.
Figure 2A:
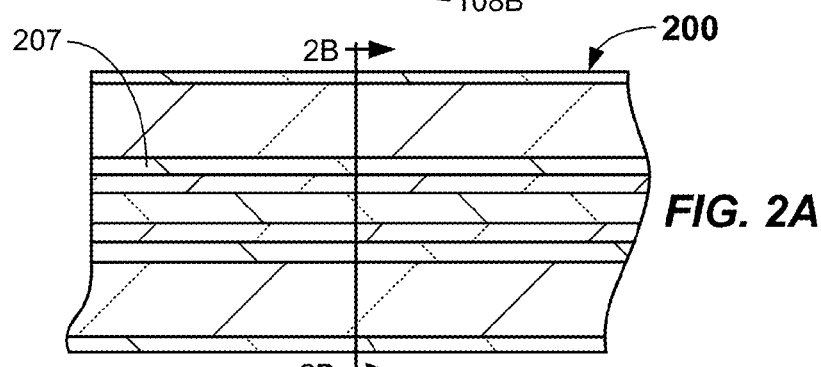
FIG. 2A is a cross-sectional side view of a structure-forming fiber used to manufacture the optical device of FIG. 1A-1B.
Figure 2B:
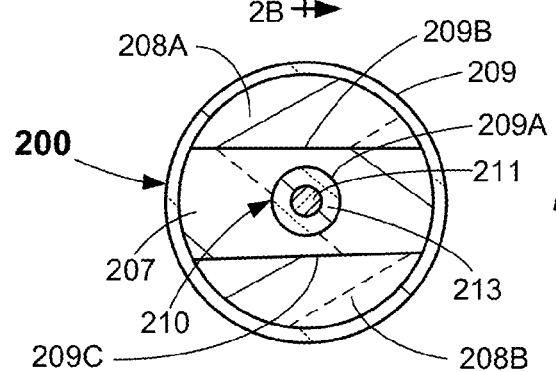
FIG. 2B is a cross-sectional end view of the structure-forming fiber of FIG. 2A taken along section line 2B-2B.
Figure 3A:
FIG. 3A is a side plan view of a structure-forming fiber and an optical component (e.g., lead-in optical fiber) prior to bonding.
Figure 3B:
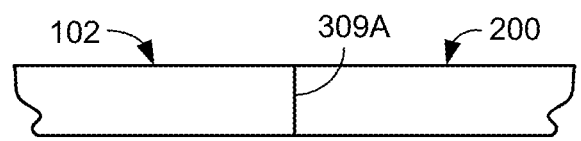
FIG. 3B is a side plan view of a structure-forming fiber bonded to the optical component (e.g., lead-in optical fiber).
Figure 3C:
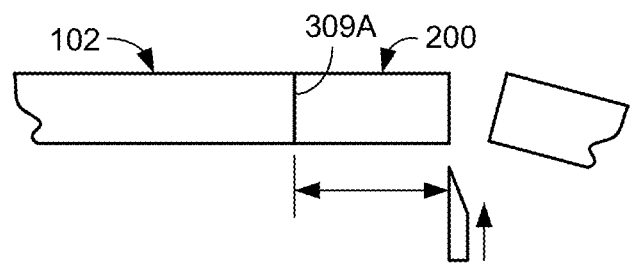
FIG. 3C is a side plan view of a structure-forming fiber bonded to the optical component (e.g., optical fiber) wherein the structure-forming fiber is cleaved to a desired length.
Figure 3D:
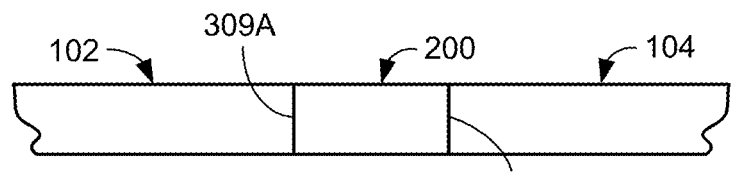
FIG. 3D is a side plan view of a structure-forming fiber bonded between a first and second optical components.
Figure 3E:
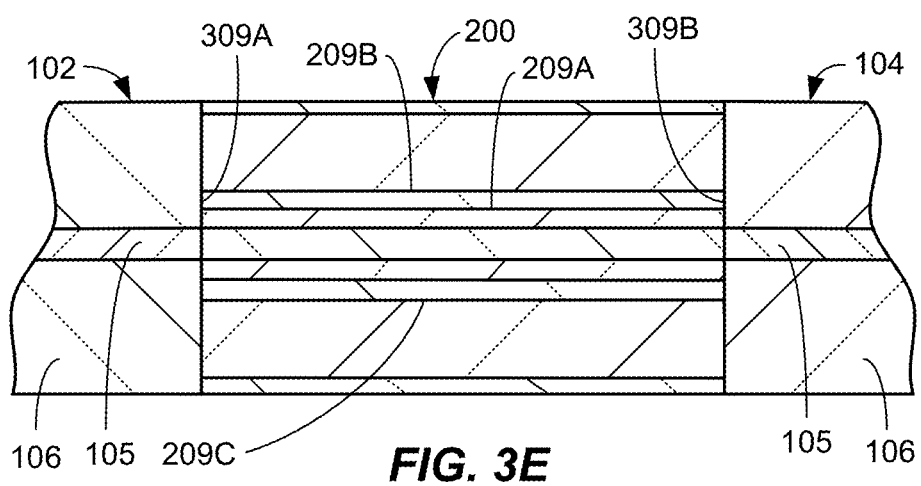
FIG. 3E is a cross sectioned side view of a structure-forming fiber bonded between a first and second optical component.

A first embodiment of the present invention method is described with reference to FIGS. 1A-3E. An optical device 100 may be formed in accordance with the present invention. The method of manufacturing an optical device 100 includes providing a structure-forming fiber 200 bonded to at least one other optical component on a first end. The at least one other optical component may be an optical fiber, such as lead-in optical fiber 102. The structure-forming fiber 200 may also be bonded to another optical component, such as lead-in fiber 104 at a second end. The structure-forming fiber 200, as best shown in FIGS. 2A-2B, includes a preferentially-etchable portion 207 and at least one radial etching boundary (e.g., 209A). In the depicted embodiment, second and third radial etching boundaries 209B and 209C are also provided. At least one axial etching boundary (e.g., 309A) is formed at the axial interface between the structure-forming fiber 200 and the optical component (e.g., lead-in fiber 102) as shown in FIG. 3E. The at least one radial etching boundary 209A is adapted to substantially slow an etching rate in an etching medium when the etching progresses to the radial boundary 209A. Likewise, the at least one axial etching boundary 309A is adapted to substantially slow an etching rate in an etching medium when the etching progresses to the axial boundary 309A. An additional axial etching boundary 309B may be provided by cleaving the structure-forming fiber 200 to a predetermined length by cutting, cleaving breaking and polishing, or other suitable cutting method, and then bonding a second optical component 104 to the end of the structure-forming fiber 200. The end surface of the cleaved structure-forming fiber 200 may be substantially perpendicular to a length of the structure-forming fiber 200. In the embodiment shown in FIG. 3E, three radial etching boundaries 209A, 209B, 209C and two axial etching boundaries 309A, 309B are provided. However, only one axial etching boundary and only one radial etching boundary may be provided in some embodiments.

In another step of the method, the assembly of optical components 102, 104 and the structure-forming fiber 200 is then exposed to an etchant medium. The etchant medium may etch the preferentially-etchable portion 207 away at a relatively rapid rate until the radial and axial etching boundaries are reached. As will become apparent, the axial etching boundaries 309A, 309B and the radial etching boundaries 209A, 209B, 209C essentially stop the progression of the etching because they comprise a material that etches at a substantially slower rate than the material of the preferentially-etchable portion 207. Because of the use of the preferentially-etchable portion 207 and the at least one radial and axial etching boundaries, precise photonic structures may be rapidly formed.

The structure and composition of the structure-forming fiber 200 will now be described with reference to FIGS. 2A-2B. The structure-forming fiber 200 may include a preferentially-etchable portion 207 within the structure-forming fiber 200. The preferentially-etchable portion 207 is adapted to etch at higher etching rate than the surrounding material. The difference in etching rate between the preferentially-etchable portion 207 and other material comprising the structure-forming fiber 200 and the location of the etching boundaries determines the achievable photonic structure created by the manufacturing method. Accordingly, methods of the invention may include providing a dopant composition for the preferentially-etchable portion 207 that significantly increases an etching rate of that portion 207 as compared to the other regions or portions of the structure-forming fiber 200.

In another aspect, void elements, such as voids, holes, porosity, bubbles, macro- capillaries, micro-capillaries, or nano-capillaries may be provided in at least a portion of the preferentially-etchable portion 207 of structure-forming fiber 200. In yet another aspect, micro-cracks may be provided in at least a portion of the preferentially-etchable portion 207. Combinations of the aforementioned may also be provided. Such void elements and microcracks will be described more fully below.

According to one aspect of the invention, in order to significantly increase the etching rate of the preferentially-etchable portion 207 in comparison to other portions, a concentration of a dopant in silica is provided therein. While germania doping may be used as the preferentially-etchable portion 207 to produce one or more of the present optical devices, in a preferred implementation of the invention other dopants may be used to more significantly increase an etching rate at considerably lower dopant concentrations and thereby provide relatively lower stress build up. In particular, a phosphorus pentoxide ($P_2O_5$) dopant may be used in the preferentially-etchable portion 207 to significantly increase an etching rate of the $P_2O_5$-doped silica at relatively lower molar concentrations as compared to equivalent rates with germania-doped silica. $P_2O_5$-doped silica may, for example, etch up to about 100 times faster than substantially-pure silica at doping levels that are still convenient for practical fiber manufacturing. Thus, in accordance with an aspect of the invention, a very useful, 10 times or more etching rate increase as compared to the etching rate of germania-doped silica may be achieved when only approximately 4.5% mol or more of $P_2O_5$ is present in the silica glass of the preferentially etchable region 207 of the structure-forming fiber 200. Other dopants or combinations of dopants may be used to achieve enhanced etching rate of the preferentially-etchable portion 207 such as $B_2O_3$, F, $TiO_2$, $Al_2O_3$, or the like. However, the increase in the etching rate of the silica in these cases may carry problems of internal stress build-up and achieve etching rates that are considerably less favorable than in case of phosphorus pentoxide etching. Combinations of $P_2O_5$ and F, or $P_2O_5$ and $B_2O_3$ in silica may be used to create preferentially-etchable portions while controlling the refractive index of such regions. Accordingly, it is preferred that the preferentially-etchable portion 207 of the structure-forming fiber 200 may be doped with approximately 2% mol or more of $P_2O_5$ in silica. $TiO_2$ or $Al_2O_3$ may be used in areas where a refractive index increase is desired, but where a relatively low etching rate is desired, such as in exposed ends of cores (e.g., cores 105).

The first radial etching boundary 209A of the method may be provided by a material of a waveguide-forming portion 210. For example, the waveguide-forming portion 210 may include a core-forming portion 211 and an inner cladding forming portion 213. The inner cladding forming portion 213 may include a thickness of between about 0.5 and 5 microns, for example. Other thicknesses may be used. The inner cladding 113 may, in some embodiments, extend along the entire length of the field interaction region 110. The "field interaction region" as used herein is the region where the propagating optical field may be interacted with, such as by a fluid, material, or device. The radial thickness of the cladding 113 may also be tuned. Additionally, the inner cladding forming portion 213 may function as an etching boundary layer during a manufacturing process of the optical device 100. The cladding 113 may be a substantially-pure silica material, for example, thereby having a relatively low etching rate.

The core-forming portion 211 may be doped with any dopant that increases the refractive index of the silica (e.g., germania). Germania doping of the core forming portion 211 at between 2 and 25 mol % in silica may be provided, for example. In some embodiments, the core-forming portion 211 may be substantially matched to the parameters of the core 105 of one or both of the lead-in fibers 102, 104. For example, the core forming portion 211 may have a substantially same refractive index, size (e.g., a substantially same outer core diameter), and a substantially same numerical aperture as one or both to minimize optical loss between lead-in fibers 102, 104 and the field interaction region 110. The diameter of the core-forming portion 211 may be between about 2 μm and 70 μm, for example. The numerical aperture of the core-forming portion 211 may be between about 0.05 and about 0.3, for example.

The second and third radial etching boundaries 209B, 209C of the method may be provided by a material of a structure-forming portion 208A, 208B of the structure-forming fiber 200. The material of the structure-forming portions 208A, 208B may be substantially-undoped silica. In the completed etched configuration, the field interaction region 110 may be a thin, fiber-like cylindrical structure that extends between the lead-in fibers 102, 104. The field interaction region 110 may be manufactured from a suitable optically transmissive material, such as silica or doped silica. Preferably, the composition of the core 111 may be substantially the same as the core 105 of at least the lead-in fiber 102. The outer dimension of the field interaction region 110 may be substantially constant between the lead in fibers 102, 104.

An outer cladding 209 may be provided surrounding the other portions to aid in bonding (splicing) the structure-forming fiber 200 to the other optical components 102, 104. The outer cladding 209 may be substantially-undoped silica. By the term substantially undoped or substantially-pure silica as used herein, it is meant that less than about 0.5 mol % of a dopant may be provided.

In more detail, the shape, cross-sectional dimensions, and optical functional properties of the produced optical device 100 are determined by the design of the structure-forming fiber 200 and the extent of etching, i.e., location of the radial and axial etching boundaries. As a part of the manufacturing method, upon exposure (e.g., immersion) of the structure-forming fiber 200 (duly spliced to one or in-between two lead-in fibers 102, 104) to the etching medium, the preferentially-etchable portion 207 of the structure-forming fiber 200 may be selectively etched to produce the target (desired) shape of the interaction region 101 of the optical device 100. The preferentially-etchable portion 207 exhibits a high etching rate as compared to the structure-forming portions 208A, 208B and the interaction region forming portion 210, and therefore will be rapidly and preferentially removed upon etching as compared to the lower etching rate materials. Accordingly, a final configuration of the optical device 100 will be largely determined by the position and shape of the portions that exhibit relatively low etching rates, as these portions will function as etchant boundaries.

To assure proper formation of the support structure (e.g., 108A, 108B) during the etching process, the circular symmetry of the structure-forming fiber 200 needs to be broken in order to allow selective, non-symmetric removal of one or more radial portions of the structure-forming fiber 200 and removal of the preferentially-etchable portion 207 through one or more formed radial openings. To assist in the preferential removal of portions of the structure-forming fiber 200 during etching, the preferentially-etchable portion 207 extends radially in two directions to the outer cladding 209. When the structure-forming fiber 200 is exposed to the etching medium, the outer cladding 209 will be first removed uniformly until the etching medium penetrates to and reaches the preferentially-etchable portion 207. Upon reaching the preferentially-etchable portion 207, the etching medium will continue to remove the preferentially-etchable portion 207 at a very rapid rate. Since the etching rate when exposed to the etching medium of the preferentially-etchable portion 207 can be three or more times, five or more times, ten or more times, fifty or more times, or even one hundred or more times higher than the etching rate of pure silica in the same medium, the selective removal of preferentially-etchable portion 207 will be performed within relatively short period of time. Within the same time interval, any removal of support structure-forming portions 208A, 208B will be relatively slow, and, thus, limited. Likewise, removal of the inner cladding forming portion 213 will be relatively slow, and, thus, limited. After removal of the entire preferentially-etchable portion 207 to the axial and radial boundaries, a significant part of the support structure-forming portion 208A, 208B and inner cladding forming portions 213 will therefore remain intact and will form support structures 108A, 108B of the optical device 100 and inner cladding 113 as shown in FIGS. 1A and 1B.

Furthermore, the inner cladding forming portion 213 of substantially-pure silica will prevent immediate penetration of the etching medium to the core forming portion 211 that is also doped and could be potentially effectively attacked by the etching medium. The role of the inner cladding forming portion 213 is to act as a radial etching boundary to substantially slow the radial etching rate of the interaction region forming portion 210, and, thus, allow better controlled formation of the field interaction region 210. The inner cladding forming portion 213 may also be used to fine tune optical properties of the field interaction region 210, such as for example the strength of the evanescent field at the outer surfaces of the field interaction region 210.

The structure-forming fiber 200 may be formed using a convention optical fiber manufacturing techniques. The preform (boule) from which the optical fiber is drawn may, in the FIGS. 2A and 2B embodiment, be formed from cut, polished, and/or drilled preform segments. The segments may come from preforms formed by conventional modified chemical vapor deposition (MCVD) or outside vapor deposition (OVD) methods, rod-in tube, stack-and-draw methods, or the like, after consolidation thereof. Other manufacturing methods may be used.

In more detail, after etching is completed to form the optical device 100, a support structure 108 that in the depicted embodiment includes first and second support structures 108A, 108B, a field interaction region 110 that may be adapted to allow interaction with an optical field propagating therein, and a void region 112 are formed. The void region 112 may substantially surround the field interaction region 110 in some embodiments. One or more radial openings 112A, 112B may be formed by etching and connect to the void region 112 from the outer perimeter of the optical device 100. The radial openings 112A, 112B may extend radially to the field interaction region 110 and may extend axially (along the axial axis 114) to the cladding 106 of each of the lead-in fibers 102, 104. The claddings 106 may function as axial etching boundaries that limit an extent of axial etching thereat. This is because the claddings 106 may comprise materials exhibiting a relative slow etching rate, such as substantially-pure silica, when compared to the material of the preferentially-etchable portion 207.

The support structure 108 may include one or more structural elements (e.g., two support structures 108A, 108B in this embodiment) that may function to assure an acceptable level of mechanical and structural integrity and strength of the optical device 100. The support structure 108 may be distributed (e.g., symmetrically or asymmetrically arranged) around a central axis 114 of the optical device 100. In some embodiments, the support structure 108 may include a first support structure 108A spaced from the central axis 114, and a second support structure 108B spaced from the central axis 114 on an opposite side of the axis 114 from the first support structure 108A. Other arrangements for the support structure 108 may be used.

The support structure 108 may provide structural support during device handling, packaging, installation, and other intended or unintended mechanical interactions of the optical device 100 with its surroundings. The support structure 108 may be constituted of any number of cross-sectional shapes.

Figure 8:
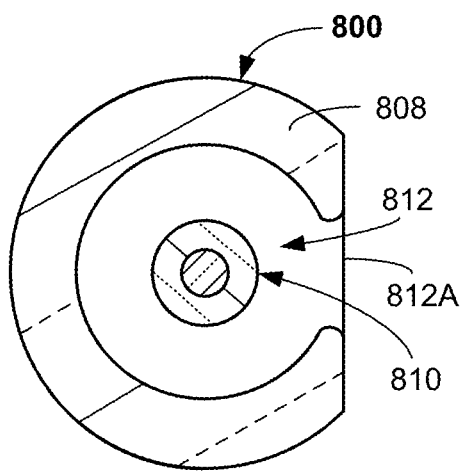
FIG. 8 is a cross sectioned end view of an optical device produced following the etching of the structure-forming fiber of FIG. 6 with only one portion of the structure-forming portion being removed.
Figure 10:
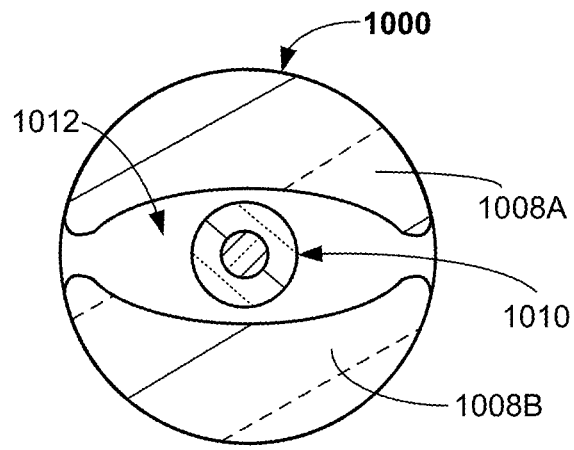
FIG. 10 is a cross sectioned end view of an optical device produced following the etching of the structure-forming fiber of FIG. 9.
Figure 12:
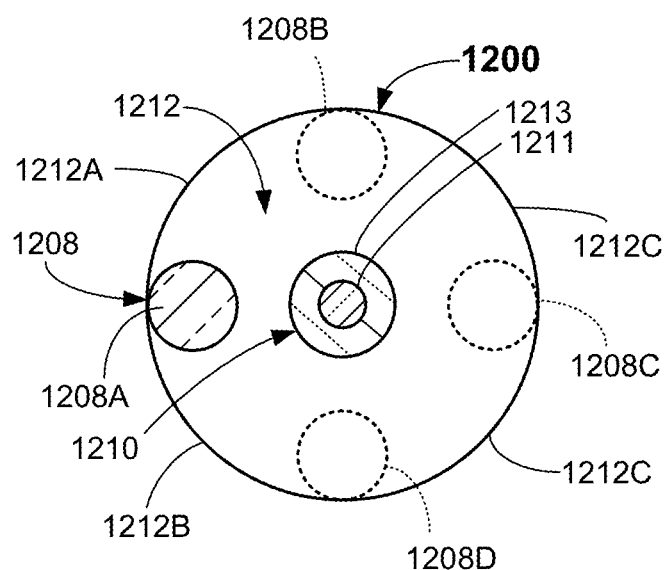
FIG. 12 is a cross sectioned end view of an optical device produced following the etching of the structure-forming fiber of FIG. 11.

In some embodiments, the support structures 108A, 108B may have, for example, a quarter-moon shape as shown in FIG. 1B wherein an outer radial surface is cylindrical and an inner surface is generally, but not necessarily, planar. In the embodiment of FIG. 5A, the support structure 508 may include outer and inner arc surfaces having roughly the same arc center that may be coincident with the central axial axis of the optical device 500. Each of the support structures 508A, 508B may be symmetrical (e.g., mirror images of one another), for example. Optionally, as shown in FIG. 12, a support structure 1208 may consist of one or more rods 1208A-1208D of generally circular, generally elliptical, or any arbitrary cross-sectional shape. FIG. 8 illustrates a support structure 808 of an optical device 800 wherein the support structure 808 comprises a single structural support. The support structure 808 is spaced from the field interaction region 810 and a void 812 substantially surrounds the field interaction region 810 along its length. In this embodiment, a single radial opening 812A is provided that extends axially between the lead-in fibers 102, 104 (not shown). FIG. 10 illustrates an embodiment wherein the support structure 1008A, 1008B comprises segments with cylindrical outer surfaces and curved inner surfaces. In this embodiment, the arced surfaces do not share a common arc center.

Again referring to FIG. 1A-1B, the field interaction region 110 functions as part of the optical device 100 where an optical field passing through the optical device 100 as provided from a sending unit of an optical system (not shown) may interact with functional or functionalized materials, an interaction device, or a surrounding environment. For example, in one embodiment, the field interaction region 110 may be in fluid communication with a surrounding fluid. The fluid may be liquid or gas, for example. In some embodiment, the fluid may be a bio-fluid. In another embodiment, the field interaction region 110 may be in communication with optically active layers. For example, one or more optically active layers may be applied overtop of the field interaction region 110.

In more detail, the optical device 100 may comprise a void region 112 (e.g., a non-solid region or free space) extending axially between ends of the two lead-in optical fibers 102, 104 to enable a component, material (e.g., fluid), and/or interaction device to interact with, couple to, or contact or engage with the field interaction region 110. Access to the void region 112 and the field interaction region 110 may be provided by the one or more radial openings (e.g., openings 112A, 112B) provided in the optical device 100. In some embodiments, the radial openings (e.g., radial openings 112A, 112B) may be provided on opposite sides of the field interaction region 110. In some embodiments, a single opening is provided (see FIG. 8). While in others, more than two radial openings may be provided. For example, in the FIG. 12 embodiment, up to four radial openings 1012A-1012D may be provided. In other embodiments, the number of radial openings may include one, two, three, four, or even five or more, for example, depending upon the number of support structures formed after etching. The radial openings may extend radially inward from the outer radial perimeter of the optical device 100 to the field interaction region (e.g., 110, 510, 810, 1010, etc.). In some embodiments, the non-solid void 112 may substantially surround the field interaction region 110. As will be apparent, in some embodiments, the void 112 may extend between the cores 105 of the lead-in fibers (see FIG. 16A).

In some embodiments, the optical field interaction region 110 may include a single material constituting a core 111 that may be in direct interaction and contact with the non-solid void 112, i.e., no inner cladding 113 is present. In this configuration, the core material may be configured to have a composition that provides a relatively lower etching rate as compared to the preferentially-etchable portion 207 abutting same so that a radial etching boundary may be provided. For example, the core 111 may be comprised of substantially-pure silica or titania-doped silica or alumina-doped silica wherein the preferentially-etchable portion 207 may be $P_2O_5$-doped silica, as described herein.

Some embodiments, such as the structure-forming fiber of FIG. 4, may include one or more void elements 415A, 415B. The inclusion of the void elements 415A, 415B may allow the etchant medium to progress to the preferentially-etchable portion 407 at a relatively higher rate than at other radial locations. The structure-forming fiber 400 may be formed using a conventional optical fiber manufacturing techniques. The preform (boule) from which the optical fiber is drawn may be, in the FIG. 4 embodiment, formed by conventional inside or outside deposition methods, rod-in tube, stack and draw methods, or the like. Upon consolidation, the preform may be drilled or otherwise machined to form suitably sized holes in the preform that will form the void elements 415A, 415B upon drawing of the perform into the structure-forming fiber 400. Slight pressure may be applied during drawing to prevent collapse of the holes. The void elements 415A, 415B may be formed at radially-opposed regions in the structure-forming portion 408. The structure-forming portion 408 may comprise an annulus of substantially-pure silica. The field interaction region forming portion 410 may include a core forming portion 411 and an inner cladding forming portion 413 surrounding the core forming portion 411. The dimensions and materials may be the same as previously described. Likewise, the structure-forming fiber 400 may be bonded to lead-in fibers 102, 104 in the same manner as shown in FIGS. 3D and 3E.

FIG. 5A illustrates a cross-sectional view of an optical device 500 after the etching process has removed the radially-opposed portions of the structure-forming portion 408 adjacent to the void structures 415A, 415B to form the support structures 508A, 508B and removed the preferentially-etchable portion 407 to expose the field interaction region 510 and form the void 512 and opposed radially openings 512A, 512B. Similarly, FIG. 5A illustrates the field interaction region 510 including the core 511 and inner cladding 513. As in the previous embodiment, the field interaction region 510 of the optical device 100 extends between and connects to the cores 105 of the first and second lead-in optical fibers 102, 104. In the depicted embodiments, the lead-in optical fibers 102, 104 may include a light guiding optical structure that is adapted to carry light to and from the field interaction region 510. The light guiding optical structure may include a conventional core 105 and a cladding 106, for example. The lead-in optical fibers 102, 104 may have any arbitrary length. In some embodiments, the lead-in optical fiber 104 may be truncated or terminated.

Lead-in optical fibers 102, 104 may be, for example, single mode optical fibers, multimode optical fibers, polarization maintaining optical fibers, polarization preserving optical fibers, photonic crystal fibers, or any other practical optical fiber having the ability to carry light signals, or combinations thereof. The lead-in optical fibers 102, 104 may include two or more segments which are fused or bonded together. FIG. 5B illustrates a micrograph view of an exemplary optical device produced following the etching of the structure-forming fiber of FIG. 4.

Figure 6:
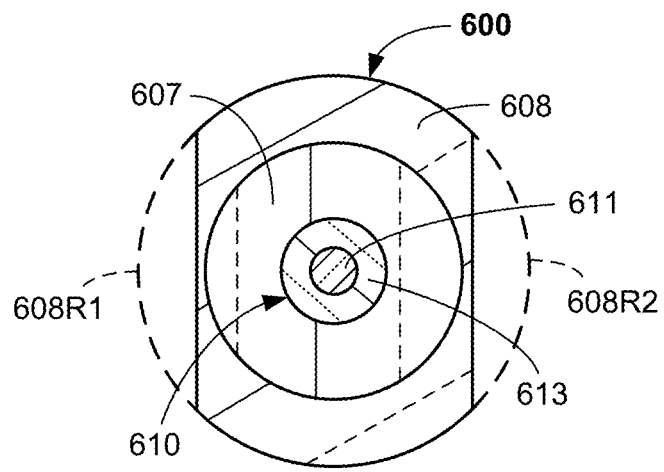
FIG. 6 is a cross sectioned end view of a structure of an alternative structure-forming fiber.
Figure 7:
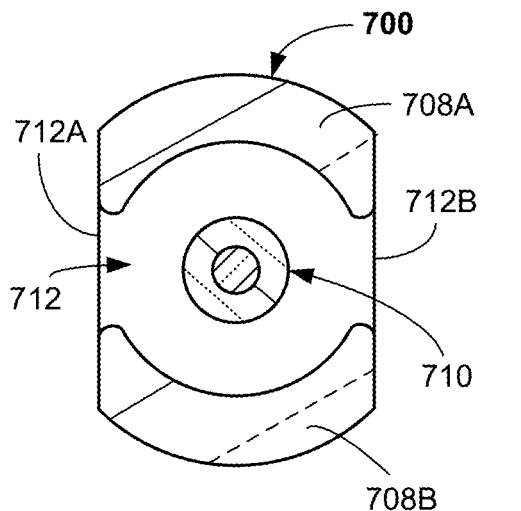
FIG. 7 is a cross sectioned end view of an optical device produced following the etching of the structure-forming fiber of FIG. 6.

FIGS. 6 and 7 illustrate an alternative embodiment of a structure-forming fiber 600 and an optical device 700 produced therefrom following the etching step. In this embodiment, the structure-forming fiber 600 being devoid of localized portions 608R1 and 608R2 (shown dotted) is provided. The portions may be mechanically removed from the preform prior to fiber manufacturing to form a region having a thin wall between the outer periphery of the structure-forming fiber 600 and the preferentially-etchable portion 607. In particular, the fiber preform may be drawn under conditions such that the flat-sided cross-sectional shape of the structure-forming fiber of FIG. 6 devoid of regions 608R1 and 608R2 is retained. The structure-forming portion 608 may comprise substantially-pure silica and the preferentially-etchable portion 607 may comprise $P_2O_5$-doped silica, for example. Other dissimilar etching rate materials may be used. The field interaction region forming portion 610 may include a core forming portion 611 and cladding forming portion 613 as previously described. Upon completion of the exposure to the etching medium, the support structures 708A, 708B are formed comprising inner and outer arcuate surfaces that may share a substantially common arc center, a field interaction region 710, void 712, and opposed radial openings 712A, 712B.

FIG. 8 illustrates an embodiment of optical device 800 where the structure-forming fiber 600 was devoid of portion (e.g., 608R2) only on one side. Accordingly, after etching, the void 812 is formed by relatively rapid removal of the preferentially-etchable portion 607 to the radial and axial etching boundaries, but only a single radial opening 812A is provided. The void 812 substantially surrounds the field interaction region 810.

Figure 9:
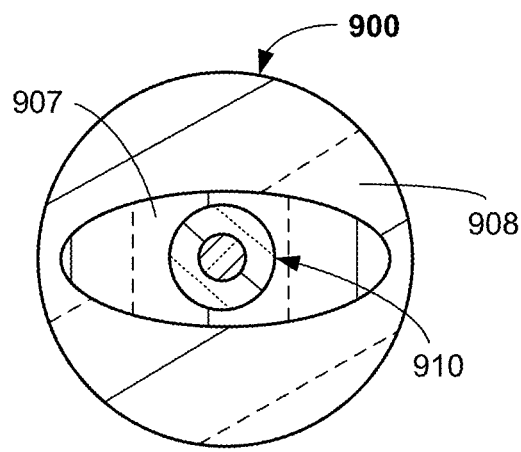
FIG. 9 is a cross sectioned end view of a structure of an alternative structure-forming fiber.

The removal of regions 608R1 and/or 608R2 may be by any suitable means such as cutting, polishing, grinding, laser ablation, or the like. The portions 608R1 and/or 608R2 may be removed on the preform prior to fiber drawing and then drawn under conditions to maintain the approximate cross sectional shape of the fiber of FIG. 6 after fiber drawing. In other embodiments, the preform may be drawn under conditions to achieve an approximately circular outer surface configuration of the structure-forming fiber 900 as shown in FIG. 9. Viscous forces during fiber drawing then may provide the preferentially-etchable portion 907 with an oblong or elliptical shape in cross section. In this embodiment, the inner and outer surfaces of the formed optical device 1000 may both be arcuate, but may not share a common arc center as is shown in FIG. 10. During manufacture, the thinnest regions between the outer periphery of the structure-forming fiber 900 and the preferentially-etchable portion 907 will be first etched away followed by rapid removal of the preferentially-etchable portion 907 to the axial boundaries (e.g., cladding of the lead-in fibers 102, 104) and radial boundaries of the field interaction region forming portion 910 and radial boundaries of the inner surfaces of the structure-forming portions 908 thereby forming the support structures 1008A, 1008B and field interaction region 1010 surrounded by void 1012.

Figure 11:
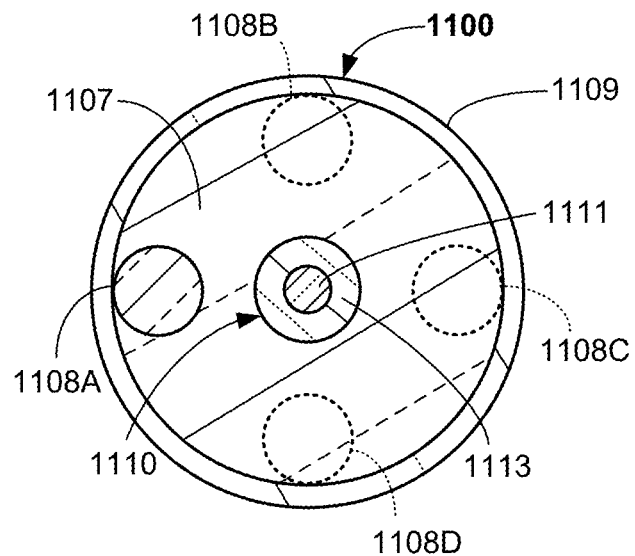
FIG. 11 is a cross sectioned end view of a structure of an alternative structure-forming fiber.

FIGS. 11 and 12 illustrate an alternative embodiment of a structure-forming fiber 1100 and an optical device 1200 produced therefrom following the etching step. In this embodiment, the structure-forming portions 1108A-1108D may comprise of one or more cylindrical rods. One rod is shown, however it should be understood that any number of rods may be used (such as those shown dotted). Preferably, the structure-forming portions 1108A-1108D may be symmetrically oriented. The structure-forming portions 1108A-1108D may comprise substantially-pure silica and the preferentially-etchable portion 1107 may comprise $P_2O_5$-doped silica. The field interaction region forming portion 1110 may include a core forming portion 1111 and cladding forming portion 1113 as previously described. Upon completion of the exposure to the etching medium, the support structure 1208A-1208D of the optical device 1200 is formed comprising cylindrical rods that extend between the lead-in fibers 102, 104. Also formed are the field interaction region 1210, void 1212, and radial openings 1212A, 1212B. FIG. 12 illustrates an embodiment of optical device 1200 where the preferentially-etchable portion 1107 is removed to form the void 1212 and a plurality of radial openings 1212A-1212D, depending upon the number of structure-forming portions utilized.

The structure-forming fiber 1100 may include a thin layer of outer cladding 1109, which may be substantially-pure silica. Upon exposure to the etching medium, the outer cladding will be removed until the preferentially-etchable portion 1107 is reached. Then the preferentially-etchable portion 1107 will be rapidly etched away to the axial boundaries (e.g., cladding of the lead-in fibers 102, 104) and radial boundaries of the field interaction region forming portion 1110 and the radial boundaries of the exterior radial surfaces of the structure-forming portions 1108A-1108D thereby forming the support structures 1208A-1208D and field interaction region 1210. The field interaction region forming portion 1110 and the structure-forming portions 1108A-1108D may comprise a material having a relatively low etching rate in the etching medium as compared to the preferentially-etchable portion 1107. For example, the field interaction region forming portion 1110 and the structure-forming portions 1108A-1108D may comprise substantially-pure silica. The preferentially-etchable portion 1107 may comprise $P_2O_5$-doped silica.

Figure 13:
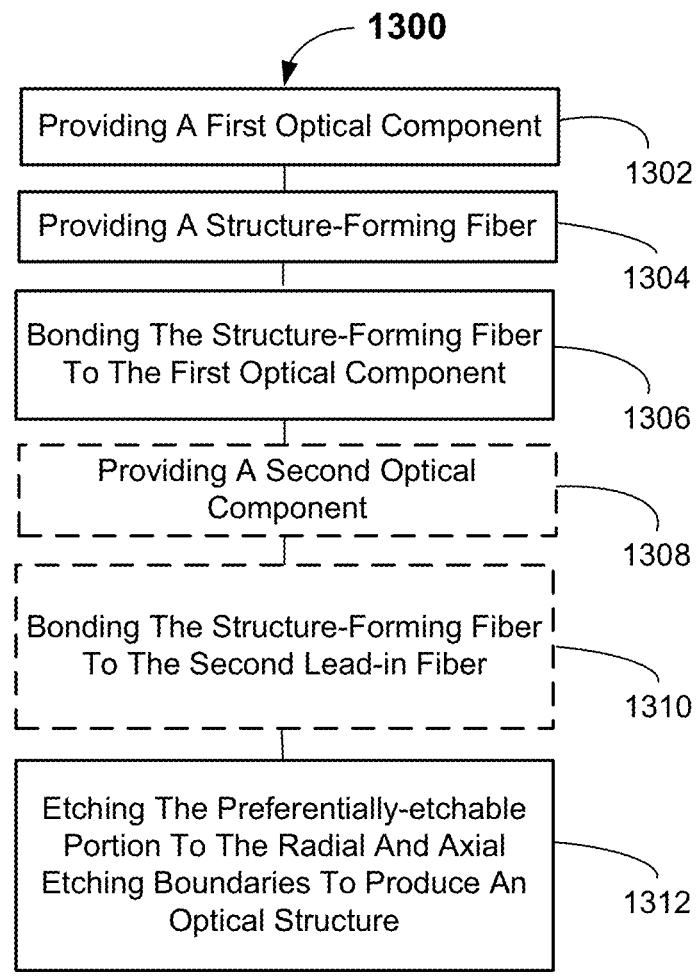
FIG. 13 is a flowchart illustrating methods according to the present invention.

A method of forming an optical device will now be described with reference to FIG. 13. The method 1300 includes providing an optical component such as a lead-in optical fiber 102 in 1302. In 1304, a structure-forming fiber is provided, such as one of the structure-forming fibers 200, 400, 600, 900, or 1100 shown in FIGS. 2A, 4, 6, 9 or 11, for example. In 1306, the structure-forming fiber is bonded to the first optical component. The structure-forming fiber has a preferentially-etchable portion and includes at least one radial etching boundary and at least one axial etching boundary. The etching boundaries effectively stop or substantially slow the progression of etching at the boundaries, as the boundaries are formed of materials exhibiting a relatively low etching rate upon exposure to the etching medium. The bonding between various fibers and components may be performed by fusion splicing, for example. Examples of fusion splicing may include arc fusion splicing, filament fusion splicing, and laser fusion splicing. Other suitable splicing methods may be used. Prior to bonding, the ends of the fiber and component may be prepared to provide substantially planar end surfaces. The preparation may include mechanical cleaving, laser cleaving, cutting, breaking and polishing, for example.

In some embodiments, in 1308, a second optical component may be provided, such as a second lead-in optical fiber 104. After the structure-forming fiber is shortened to the desired length, the structure-forming fiber may be optionally bonded to the second optical component in 1310. Shortening may be performed by mechanical cleaving, laser cleaving, cutting, breaking and polishing, or other methods. In 1312, the preferentially-etchable portion is etched, by exposure to an etching medium, to the radial and axial etching boundaries to form the desired optical structure. The etching medium may be a liquid etching medium, such as hydrofluoric acid (HF), buffered hydrofluoric acid, or in gas medium such as $SF_6$. Etching may be accomplished at room temperature (e.g., approximately 25° C.) and in moderate concentration of acid (e.g., 40% HF). Other suitable etching mediums may be employed. During etching, the etching vessel containing the etching medium may be vibrated to provide mixing and removal of etching by-products from the etched surfaces. In some embodiments, the termination of etching process may be time controlled. In other embodiments, optical feedback from an interrogation system optically coupled to, and interrogating the optical device during its manufacture, may be utilized to terminate the etching process. For example, the process may be terminated when a desired optical structure has been created according to established predetermined optical criteria. This feedback may include transmission, reflection, or any other optical property observation by optically coupling to one or both lead-in fibers 102, 104 to assure better uniformity, repeatability, and yield from the method of manufacturing the optical device.

In some embodiments, the optical structure comprises a field interaction region extending from at least the first optical component. In other embodiments, the optical structure comprises a field interaction region extending between, and connected to, both of a first optical component and a second optical component. In other embodiments, the optical structure comprises a field interaction region (e.g., 110) substantially surrounded by a void (e.g., 112). In some embodiments, the optical structure comprises a field interaction region having a core and a cladding having waveguide properties. In a preferred method implementation, the preferentially-etchable portion is removed through one or more radial openings in the structure-forming fiber.

Figure 14:
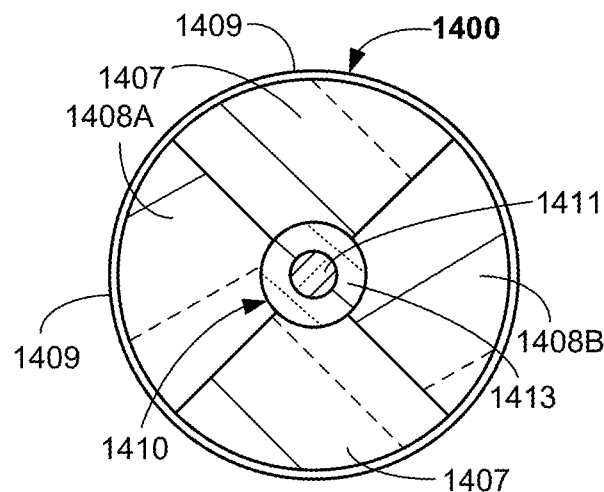
FIG. 14 is a cross sectioned end view of a structure of an alternative structure-forming fiber.
Figure 15:
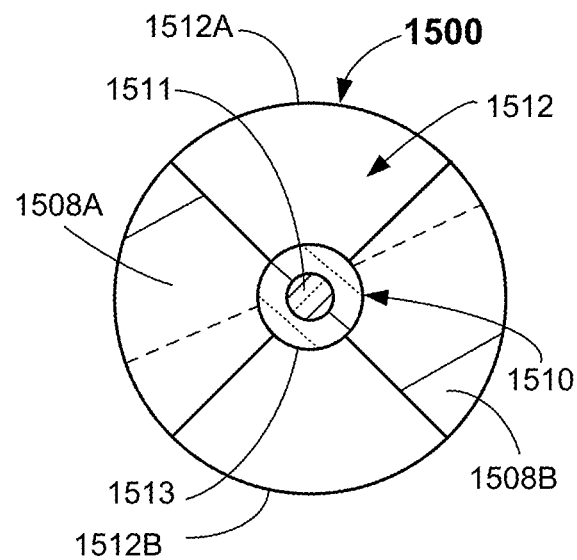
FIG. 15 is a cross sectioned end view of an optical device produced following the etching of the structure-forming fiber of FIG. 14.

FIGS. 14 and 15 illustrate an alternative embodiment of a structure-forming fiber 1400 and an optical device 1500 produced therefrom following the etching step. In this embodiment, the structure-forming portions 1408A-1408B may comprise arc segments. In the depicted embodiment of optical device 1500, two opposed arc segments 1508A, 1508B are shown, however it should be understood that any number may be used. The structure-forming portions 1408A-1408B may comprise substantially-pure silica and the preferentially-etchable portion 1407, that also comprises one or more arc segments may comprise $P_2O_5$-doped silica. The field interaction region forming portion 1410 may include a core forming portion 1411 and cladding forming portion 1413 as previously described. Upon completion of the exposure to the etching medium, the support structure 1408A-1408B of the optical device 1500 is formed comprising arc segments that extend between the lead in fibers 102, 104 and also extend from the radial periphery to the field interaction region 1510 and contact the field interaction region 1510. Also formed is the field interaction region 1510, void 1512 provided on opposed sides of the field interaction region 1510, and radial openings 1512A, 1512B extending to the field interaction region 1510. FIG. 15 illustrates an embodiment of optical device 1500 where the preferentially-etchable portion 1407 is removed to form the void 1512 and a plurality of radial openings 1512A-1512B, depending upon the number of structure-forming portions utilized.

As in previous embodiments, the structure-forming fiber 1400 may include a thin layer of outer cladding 1409 which may be substantially-pure silica. Upon exposure to the etching medium, the outer cladding 1409 will be removed until the preferentially-etchable portion 1407 is reached. Then the preferentially-etchable portion 1407 will be rapidly etched away to the axial boundaries (e.g., the cladding 106 of each of the lead-in fibers 102, 104) and radial boundaries (e.g., inner cladding forming portion 1413) of the field interaction region forming portion 1410 and the exterior radial surfaces of the structure-forming portions 1408A-1408B thereby forming the support structures 1508A-1508B and field interaction region 1510. The field interaction region forming portion 1410 and the structure-forming portions 1408A-1408B may comprise a material having a relatively low etching rate as compared to the preferentially-etchable portion 1407. For example, the inner cladding 1413 of the field interaction region forming portion 1410 and the structure-forming portions 1408A-1408B may comprise substantially-pure silica. The preferentially-etchable portion 1407 may comprise $P_2O_5$-doped silica.

Figure 16A:
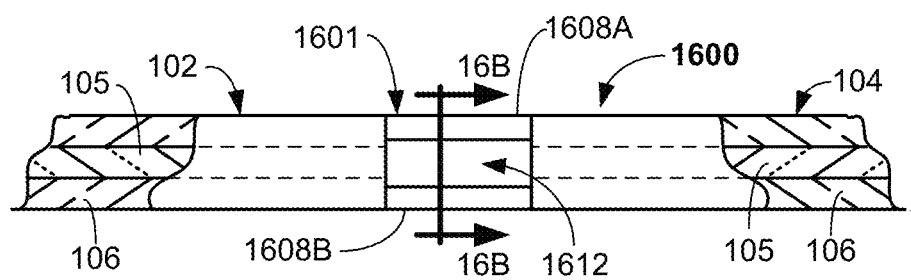
FIG. 16A is a side plan view of an alternate embodiment of optical device.
Figure 16B:
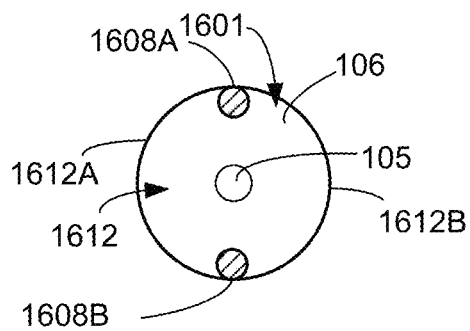
FIG. 16B is a cross sectioned end view of an optical device taken along section line 16B-16B of FIG. 16A.
Figure 17A:
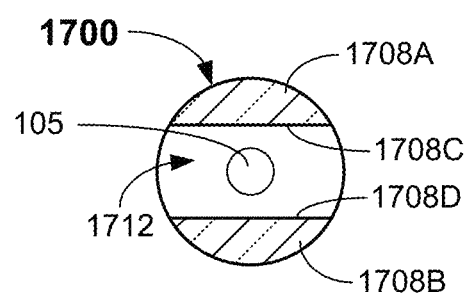
FIG. 17A is a cross sectioned end view of an alternate embodiment of optical device manufactured in accordance with the present method.
Figure 17B:
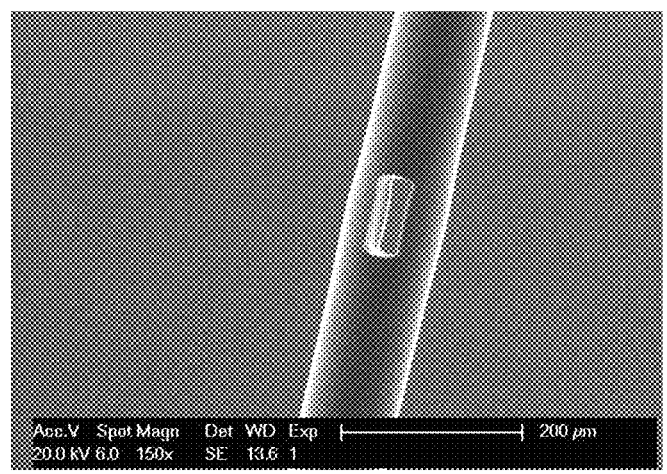
FIG. 17B is an isometric micrograph view of an alternate embodiment of optical device manufactured in accordance with the present method.
Figure 18:
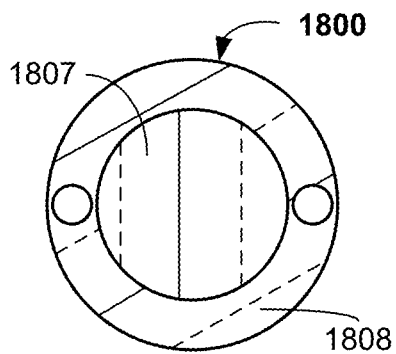
FIGS. 18-22 are cross sectioned end views of several alternate embodiments of structure-forming fibers used to manufacture optical devices in accordance with the present method.
Figure 19:
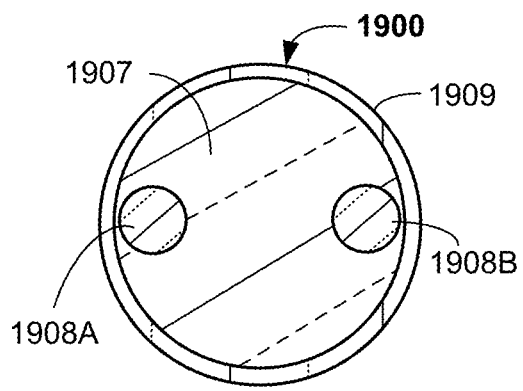
Figure 20:
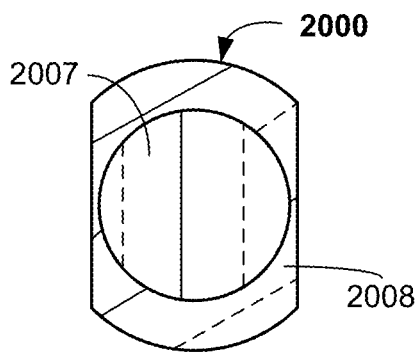
Figure 21:
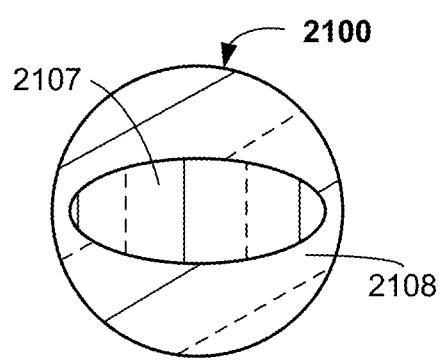
Figure 22:
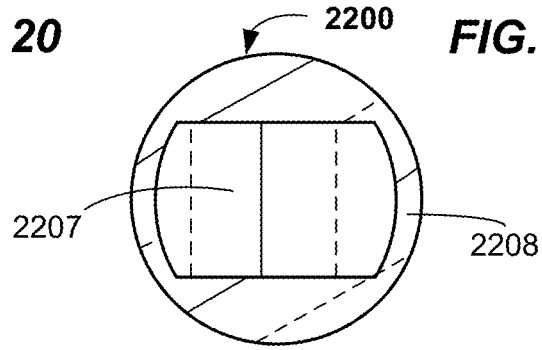

FIGS. 16A and 16B illustrate yet another embodiment of optical device 1600 including an interaction device 1601 connected between two optical components (e.g., lead-in optical fibers 102, 104). According to the method, the preferentially-etchable portion of the structure-forming fiber is removed by etching to form the void 1612 and a plurality of radial openings 1612A-1612B, depending upon the number of structure-forming portions utilized. In the depicted embodiment, two support structures 1608A, 1608B comprising rods are shown. Other numbers and types of support structures may be used. During the etching step, the preferentially-etchable portion is removed until the radial etching boundary and the axial etching boundaries are reached to produce a desired optical structure. In this embodiment, a void 1612 is located between the ends of the cores 105 of the lead-in fibers 102, 104. The axial etching boundaries comprise the cladding 106 of each of the lead-in fibers 102, 104 which may comprise a relative slow etching rate material, such as substantially-pure silica. The radial etching boundaries comprise the outer surfaces of the support structures 1608A, 1608B, which may also comprise a relative slow etching rate material such as substantially-pure silica. An alternative cross section of the optical structure of an optical device 1700 produced after etching is shown in FIG. 17A. The only difference from the previously-described structure of FIG. 16A-16B is that the support structures 1708A, 1708B comprise a curved outer surface and may include substantially-planar inner surfaces 1708C, 1708D and the radial etching boundaries comprise the inner surfaces 1708C, 1708D. As in the previous embodiment, the axial etching boundaries comprise the cladding 106 of each of the lead-in fibers 102, 104. FIG. 17B illustrates a photo micrograph of an actual embodiment of embodiment of optical device produced after etching. In the depicted embodiments, the axial etching boundary may also include the ends of the cores 105. Such cores 105 may include dopants, otherwise described herein, to cause the ends of the cores 105 to etch at a relatively slower rate than the preferentially-etchable portion.

Various alternative embodiments of structure-forming fibers 1800-2200 that may be bonded between respective lead-in fibers 102, 104 are shown in FIGS. 18-22. In each case, a preferentially-etchable portion 1807-2207 is provided that may comprise a relatively fast etching material such as $P_2O_5$-doped silica, and a structure-forming portion 1808-2208 is provided that may comprise a relatively slow etching material, such as substantially-pure silica.

In each of the aforementioned embodiments where a void extends between the cores 105 of the lead-in fibers 102, 104, the cores 105 may be doped with a material that provides a suitable relatively slow etching rate material. For example, the cores 105 of the lead-in fibers 102, 104 may be doped with a dopant that increases its refractive index but has relatively little impact on the etching rate thereof. Such dopants may be alumina or titania, for example. This is desirable, since the exposed ends of the core 105 becomes exposed for a short time to the etching medium, and use of low etching rate material for the core 105 may help to preserve good optical quality of the front surface, such front surface preferably being semi-reflective. Alumina or titania doping in an amount of 0.5 to 5 mol % in silica may be provided. Alumina or titania may be co-doped with other refractive index increasing dopants.

Figure 24B:
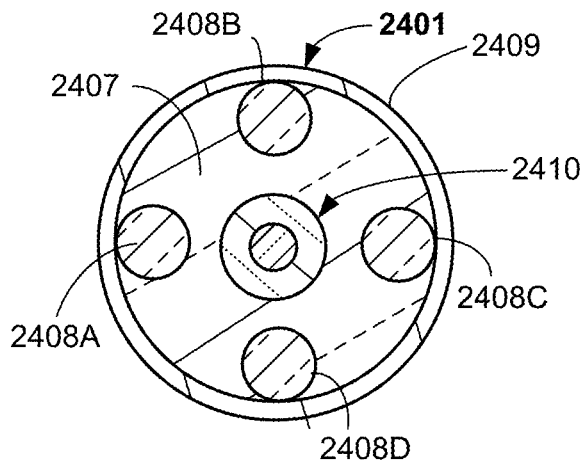
FIGS. 24B-24C are cross sectioned end views of embodiments of structure-forming fibers used to manufacture an optical device in accordance with the present method.
Figure 24C:
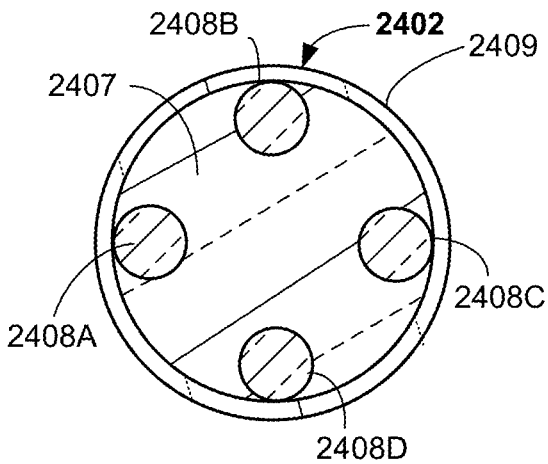
Figure 25:
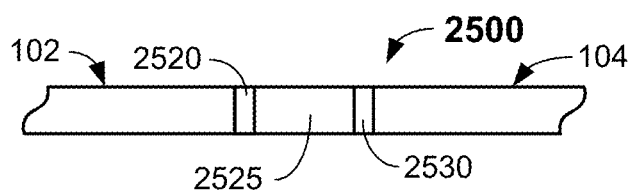
FIG. 25 is a side plan view of a bonded assembly used to manufacture an optical device in accordance with the present method.

In another embodiment as shown in FIGS. 23A-23C, an optical device 2300 is shown wherein the field interaction region 2310 comprises a waveguide structure that only extends part way between the lead-in fibers 102, 104. The interaction portion 2301 includes support structures 2308A-2308D (e.g., rods) extending axially between the lead in fibers 102, 104, a waveguide portion 2340 having a structure adapted to guide light (e.g., having a suitable core and cladding), and an axial void extending between an axial end of the waveguide portion 2340 and the end surface 104S of the core 105 of the lead-in fiber 104. To manufacture the optical device 2300, a bonded assembly 2400 is provided as shown in FIG. 24A that is made up of optical components (e.g., lead-in fibers 102, 104), and several structure-forming fibers 2401 and 2402. Thus, it should be apparent that more than one structure-forming fiber may be used with the present method. Bonding may be by any of the aforementioned bonding methods, such as fusion splicing. The cross sections of each of the structure-forming fibers 2401, 2402 are shown in FIGS. 24B and 24C. Each includes structure-forming portions 2408A-2408D, preferentially-removable portion 2407. The structure-forming fiber 2401 includes waveguide forming portion 2410. Each may include a thin outer cladding 2409 of substantially-pure silica. In the present embodiment, when exposed to the etching medium, the outer cladding 2409 of the structure-forming fibers 2401, 2402 will first be etched away, followed by the preferentially-etchable portion 2407. Etching will progress to the radial and axial etching boundaries. In this embodiment, the axial etching boundaries comprise the cladding 106 of the lead-in fiber 102, the end surface 2042 of the waveguide portion 2340, and the end face 104S of the lead-in fiber 104. The radial etching boundaries comprise the radial surfaces of the support structure 2308, and the radial surface of the waveguide portion 2340. The cladding 106 of the lead-in fiber 102, the cladding end surface 2042 of the waveguide portion 2340, the support structures 2308, the end surface 104S of the cladding 106 of the lead-in fiber 104 and the radial surface of the waveguide portion 2340 may each comprise a relative slow etching rate material, such as substantially-pure silica. The preferentially-etchable portion 2407 may comprise a relatively fast etching rate material, such as $P_2O_5$-doped silica. The core 105 of the lead-in fiber 104 and the core of the waveguide portion 2340 may comprise a low etching rate material to preserve good optical quality of the front surfaces, such surfaces preferably being semi-reflective. Alumina or titania doping in an amount of 0.5 mol % to 5 mol % in silica may be provided in the core 105 of the lead-in fiber 104.

In another embodiment, the axial etching boundaries may be formed by including in the bonded assembly 2500, pucks or short segments 2520, 2530 of substantially-pure silica or other lower etching rate material on either end of the structure-forming fiber 2525. The structure-forming fiber 2525 may have any of the structures described herein such as shown in FIGS. 2B, 4, 6, 9, 11, 14, 18-22, for example.

In another aspect, void elements, such as voids, holes, porosity, bubbles, macro-capillaries, micro-capillaries, or nano-capillaries may be provided in at least a portion of the preferentially-etchable portions of structure-forming fiber. In yet another aspect, micro-cracks may be provided in at least a portion of the preferentially-etchable portion of structure-forming fiber. Combinations of the aforementioned may also be provided. Moreover, combination of dopant materials such as doped silica (or other dopants) with the void elements and/or microcracks may be provided to further increase the etching selectivity as compared to pure silica. Such void elements and microcracks will be described more fully below and aid in increasing a relative etching rate of the material including them when exposed to the etching medium.

In some embodiments, void elements such as macro-capillaries having diameters of between about 10 μm and about 30 μm may be introduced. Similarly, micro-capillaries having diameters of between about 1 and about 10 μm may be introduced. In other embodiments, nano-capillaries having diameters of between about 0.01 and about 1 μm may be introduced. The capillaries may be produced by rod-in-tube stacking of thin silica tubes having center voids, preform drilling, deposition of porous layers. In some embodiments, such void elements may be conveniently introduced into the structure-forming fiber to break the circular symmetry of the structure-forming fiber that is provided to achieve formation of support structures, voids, radial openings, and/or field interaction region in the resultant optical device.

Figure 26A:
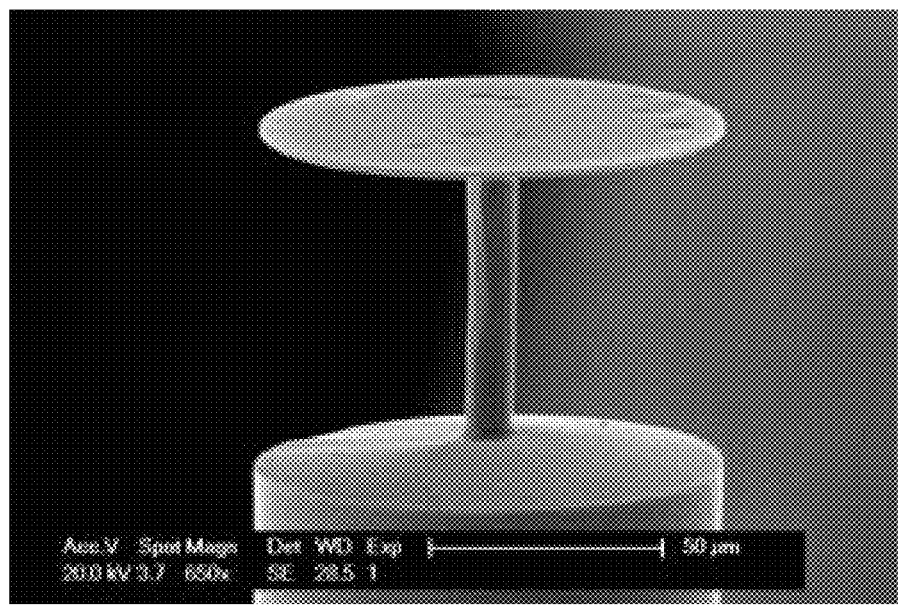
FIG. 26A is a micrograph view of an alternate embodiment of micro-resonator optical device manufactured in accordance with the present method.
Figure 26B:
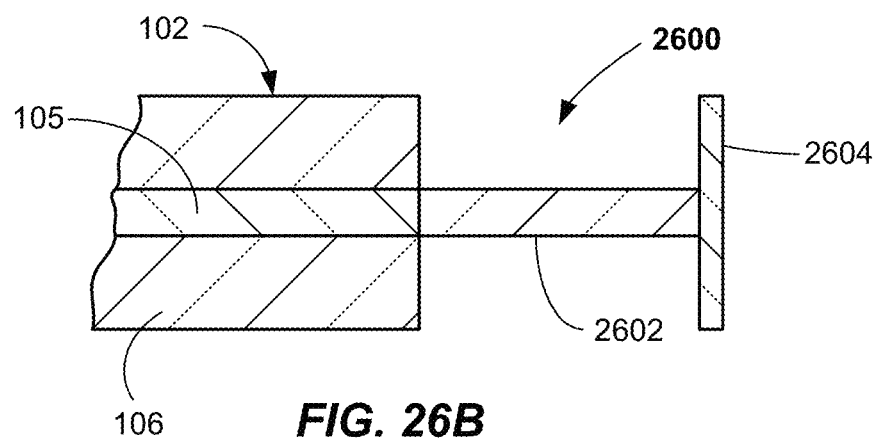
FIG. 26B is a cross sectional side view of an alternate embodiment of a micro-resonator optical device manufactured in accordance with the present method.

FIGS. 26A and 26B illustrate an alternative embodiment of an optical device 2600 produced according to the method of the present invention. This embodiment of optical device 2600 as depicted in FIG. 26B can perform several functions. First, the structure can be used as an all-silica ring micro-resonator. In this case the lead-in fiber 102 and a beam 2602 acts as mechanical support to the disk 2604. Lead-in fiber 102 and the beam 2602 do not perform any optical function. Lead-in fiber 102 can thus be a silica rod having no core, for example. Disk 2604 acts as a micro-resonator when the disk is further coupled to another optical device or another waveguide (not shown in FIG. 26.). This can be performed by bringing the disk 2604 into proximity or contact at its outer edge with another device or waveguide. Second, a structure shown in FIGS. 26A and 26B can act as a sensor. In this case the device 2600 includes a lead-in fiber 102 having a core 105, a beam 2602 coupled to the lead-in fiber 102, and a disk 2604 coupled to the end of the beam 2602. The length and diameter of the beam 2602 and the properties of the disk 2604 may be chosen to provide the desired sensor properties of the optical device 2600 for the particular application. These applications might for example include fluid flow, acceleration, and vibration measurements through detection of beam 2602 bending or elongation.

Figure 28:
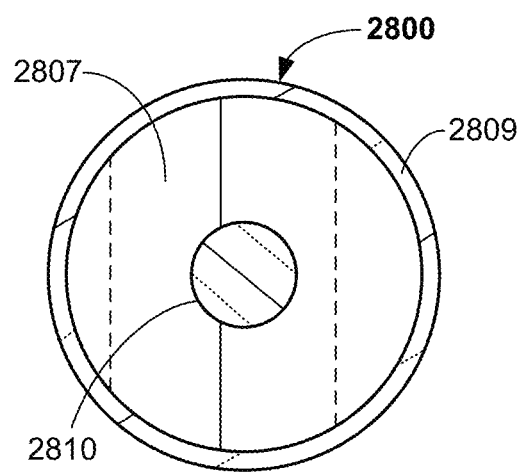
FIG. 28 is a cross sectioned end view of an embodiment of structure-forming fiber used to manufacture an optical device in accordance with the present method.

As in the previous embodiments, the structure-forming fiber 2800, shown in FIG. 28, may include structure-forming portion 2810 that may comprise a cylindrical rod. The structure-forming portion 2810 may comprise substantially-pure silica. Optionally, the structure-forming portion 2810 may comprise a core of doped silica and a thin cladding of substantially-pure silica as otherwise described herein. If the beam 2602 does not have a core, beam-air (or surrounding medium) interface will form a necessary waveguiding properties, albeit having a waveguide structure having a core and cladding may be more efficient at carrying light signals to and reflected from the mass 2604. A preferentially-etchable portion 2807 surrounding the structure-forming portion 2810 may comprise $P_2O_5$-doped silica. A thin outer cladding layer 2809 may comprise substantially-pure silica.

Figure 27:
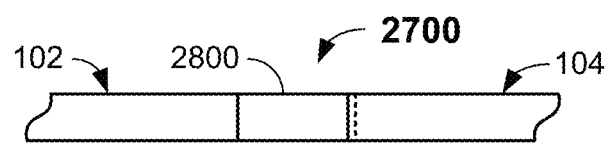
FIG. 27 is a side plan view of a bonded assembly used to manufacture the micro-resonator optical device of FIG. 26A and 26B in accordance with the present method.

As shown in FIG. 27, the structure-forming fiber 2800 is bonded to the lead in fiber 102, cleaved to the desired length, and then bonded to a lead-in fiber 104. The lead-in fiber 104 is then carefully cleaved or otherwise shortened (e.g., via polishing or the like) at dotted line to leave a thin section that will form the disk 2604 after etching. The lead in fibers 102, 104 each may be a suitable optical fiber such as a single mode fiber (SMF) or multimode fiber (MMF) having a core 105 and cladding 106. In some embodiments, the lead-in fiber 102 may be a SMF or a MMF, and the lead-in fiber 104 may be a coreless optical fiber of substantially-pure silica, for example. In accordance with the method, the assembly 2700 is etched by exposing the assembly 2700 to a suitable etching medium as described herein. Upon completion of the exposure to the etching medium, the beam 2402 of the optical device 2600 is formed comprising a cylindrical rod that extends between the lead-in fiber 102 and disk 2604. The disk 2604 is also formed. Once the thin outer cladding 2809 is etched away, etching of the preferentially-etchable portion 2807 progresses at a rapid rate until the axial etching boundaries at the ends of the lead-in fibers 102, 104 and the radial etching boundary at the outer radial surface of the structure-forming portion 2810 are reached. In the preferred implementation, the etching progresses to the boundaries or slightly past them substantially along the entire area of the boundaries.

Figure 29A:
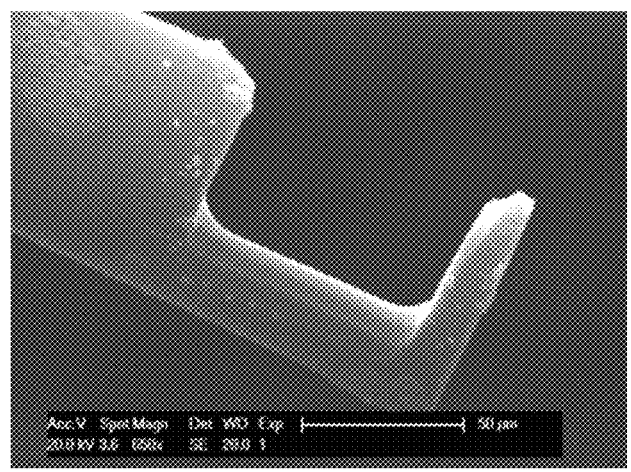
FIG. 29A is a micrograph view of an alternate embodiment of optical device manufactured in accordance with the present method.
Figure 29B:
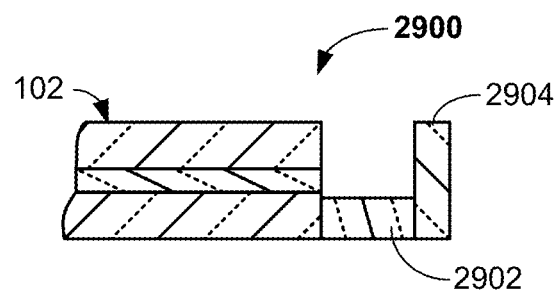
FIG. 29B is a cross sectional side view of an alternate embodiment of an optical device manufactured in accordance with the present method.

FIGS. 29A and 29B illustrate an alternative embodiment of an optical device 2900 produced according to the present invention. This embodiment of optical device 2900, as best depicted in FIG. 29B, is a cantilevered optical device including a lead-in fiber 102 (e.g., a single mode fiber or multimode fiber), a beam 2902 coupled to the lead-in fiber 102, and an end portion 2904 coupled to the end of the beam 2902. In this embodiment, the beam 2902 is offset from the centerline of the lead-in fiber 102.

Figure 31:
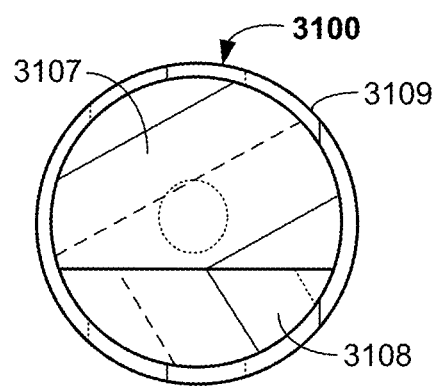
FIG. 31 is a cross sectioned end view of an embodiment of structure-forming fiber used to manufacture an optical device of FIGS. 29A and 29B in accordance with the present method.

As in the previous embodiments, the structure-forming fiber 3100, shown in FIG. 31, may include a structure-forming portion 3108 that may comprise a truncated cylinder or other arbitrary shape, such as a cylindrical rod. The structure-forming portion 3108 may comprise substantially-pure silica and that is offset from the centerline of the structure-forming fiber 3100. A preferentially-etchable portion 3107 provided adjacent to the structure-forming portion 3108 may comprise $P_2O_5$-doped silica. The preferentially-etchable portion 3107 is large enough that it overlaps the core location of the lead-in fiber 102, whose position is shown as a dotted circle in FIG. 31. A thin outer cladding layer 3109 may comprise substantially-pure silica.

Figure 30:
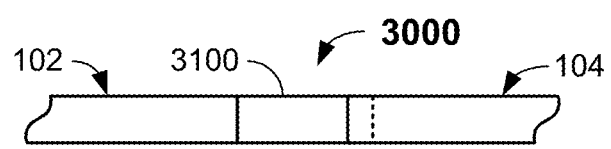
FIG. 30 is a side plan view of a bonded assembly used to manufacture the optical device of FIGS. 29A and 29B in accordance with the present method.

As shown in FIG. 30, the structure-forming fiber 3100 is bonded to the lead in fiber 102, cleaved to the desired length, and then bonded to a lead-in fiber 104. The length may be, for example, between about 5 μm and about 10,000 μm. The lead-in fiber 104 is then cleaved at dotted line to leave a thin section that will form the end portion 2904 after etching. The length of the remaining portion should be between 5 and 1000 μm. The lead-in fiber 102 may be a SMF or MMF having a core and cladding. The lead-in fiber 104 may be a coreless optical fiber of substantially-pure silica, for example. In accordance with the method, the assembly 3000 is etched by exposing the assembly 3000 to an etching medium. Upon completion of the exposure to the etching medium, the beam 2902 of the optical device 2900 is formed comprising a radially truncated cylinder that extends between the lead-in fiber 102 and the end portion 2904. Once the thin outer cladding 3109 is etched away, etching of the preferentially-etchable portion 3107 progresses at a rapid rate until the axial etching boundaries at the ends of the lead-in fibers 102, 104 and the radial etching boundary at the inner radial surface of the structure-forming portion 3108 are reached (or slightly exceeded). In an optional embodiment, a thin layer of a coreless optical fiber may be added between the lead-in fiber 102 and the structure-forming fiber 3100. In this way, a smoother optical surface may be provided in line with the core of the lead-in fiber 102.

Figure 32:
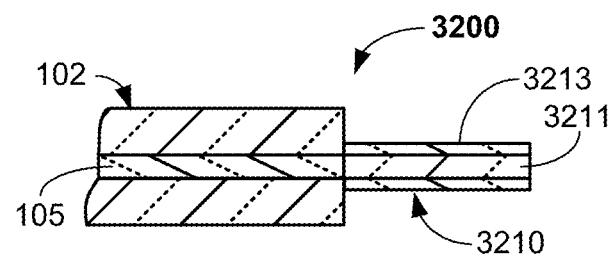
FIG. 32 is a cross sectional side view of an alternate embodiment of an optical device manufactured in accordance with the present method.

FIG. 32 illustrates an alternative embodiment of an optical device 3200 produced according to the present invention. This embodiment of optical device 3200 includes a lead-in fiber 102, and a thin beam interaction member 3210 coupled to the core 105 of the lead-in fiber 102. The beam interaction portion 3210 may include a core 3211 and a cladding 3213 surrounding the core 3211 along its entire length.

Figure 34:
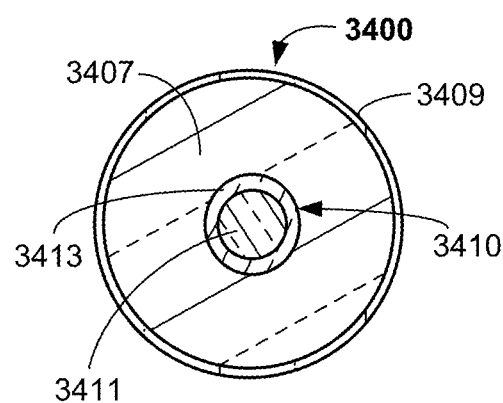
FIG. 34 is a cross sectioned end view of an embodiment of structure-forming fiber used to manufacture the optical device of FIG. 32 in accordance with the present method.

As in the previous embodiments, the structure-forming fiber 3400, as shown in FIG. 34, may include structure-forming portion 3410. The structure-forming portion 3410 may comprise a core-forming portion 3411 of doped silica, such as titania-doped silica, and a cladding-forming portion 3413 of substantially-pure silica. A preferentially-etchable portion 3407 surrounds the structure-forming portion 3410 and may comprise $P_2O_5$-doped silica. A thin outer cladding layer 3409 may comprise substantially-pure silica.

Figure 33:
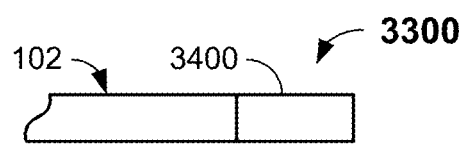
FIG. 33 is a side plan view of a bonded assembly used to manufacture the optical device of FIG. 32 in accordance with the present method.

As shown in FIG. 33, the structure-forming fiber 3400 is bonded to the lead in fiber 102, and then cleaved to the desired length. The length may be, for example, between 3 μm and 1,000 μm. The lead-in fiber 102 may be a SMF or MMF having a conventional core and cladding structure. In accordance with the method, the assembly 3300 is etched by exposing the assembly 3300 to an etching medium. Upon completion of the exposure to the etching medium, the optical device 3200 is formed comprising the lead-in fiber 102 and the beam interaction portion 3210 coupled thereto. Etching of the preferentially-etchable portion 3407 progresses at a rapid rate until the axial etching boundary at the end of the lead-in fiber 102 and the radial etching boundary at the inner radial surface of the cladding-forming portion 3413 are reached. The thin outer cladding 3409 is entirely etched away during the process.

The foregoing description discloses only exemplary embodiments of the invention. Modifications of the above-disclosed apparatus and methods which fall within the scope of the invention will be readily apparent to those of ordinary skill in the art. Accordingly, while the present invention has been disclosed in connection with exemplary embodiments thereof, it should be understood that other embodiments may fall within the spirit and scope of the invention, as defined by the following claims.

The invention claimed is:

1. A method of manufacturing an optical device, comprising:
    providing a structure-forming fiber bonded to at least one other optical component, the structure-forming fiber comprising a preferentially-etchable portion having a first etching rate; and
    etching the preferentially-etchable portion to at least one radial etching boundary and at least one axial etching boundary to produce an optical structure, wherein the radial and axial etching boundaries comprise a material having a second etching rate, wherein the second etching rate is lower than the first etching rate when exposed to an etching medium wherein the etching of the preferentially-etchable portion is through at least one radial opening, wherein the at least one radial opening extends from an inner cladding in the structure-forming fiber to an outer surface of the fiber.

2. The method of manufacturing of claim 1, wherein the axial etching boundary comprises the axial interface of at least one lead-in fiber bonded to the structure-forming fiber.

3. The method of manufacturing of claim 1, wherein the at least one other optical component comprises a first lead-in optical fiber.

4. The method of manufacturing of claim 3, wherein the step of providing further includes the step of forming one axial etching boundary with a first lead-in optical fiber and a second axial etching boundary with a second lead-in optical fiber.

5. The method of manufacturing of claim 1, further comprising limiting the radial etching boundary to an inner surface of the structure-forming portions of the structure-forming fiber.

6. The method of manufacturing of claim 1, further comprising limiting the radial etching boundary to a surface of an inner cladding of the fiber to form a field interaction region forming portion of the structure-forming fiber.

7. The method of manufacturing of claim 1, wherein the preferentially-etchable portion comprises a dopant adapted to increase an etching rate in an etching medium as compared to substantially-pure silica.

8. The method of manufacturing of claim 1, wherein the preferentially-etchable portion comprises an etching rate in an etching medium that is 3 times or more greater than an etching rate in substantially-pure silica.

9. The method of manufacturing of claim 1, wherein the preferentially-etchable portion comprises $P_2O_5$-doped silica.

10. The method of manufacturing of claim 1, wherein the optical structure comprises a waveguide including a core and cladding, and the optical component comprises a lead-in optical fiber having a core and cladding and wherein the core of the lead-in optical fiber is bonded to a core of the optical structure.

11. The method of manufacturing of claim 1, wherein the structure-forming fiber includes an interaction region forming portion comprising a core, the preferentially-etchable portion surrounding the core, and an outer cladding surrounding the preferentially-etchable portion.

12. The method of manufacturing of claim 1, wherein the structure-forming fiber includes a structure-forming portion, an interaction region forming portion, the preferentially-etchable portion at least partially surrounding the interaction region forming portion.

13. The method of manufacturing of claim 1, wherein the etching produces a void substantially surrounding a field interaction region.

14. The method of manufacturing of claim 1, comprising bonding a second structure-forming fiber to the structure-forming fiber, the second structure-forming fiber having a different structure than the structure-forming fiber.

15. A method of manufacturing an optical device, comprising:
providing a structure-forming fiber bonded to at least one other optical component, the structure-forming fiber comprising a preferentially-etchable portion having a first etching rate; and
etching the preferentially-etchable portion to at least one radial etching boundary and at least one axial etching boundary to produce an optical structure, wherein the radial and axial etching boundaries comprise a material having a second etching rate, wherein the second etching rate is lower than the first etching rate when exposed to an etching medium
wherein the etching produces at least two radial openings.

16. A method of manufacturing an optical device, comprising:
providing a structure-forming fiber bonded to at least one other optical component, the structure-forming fiber comprising a preferentially-etchable portion having a first etching rate; and
etching the preferentially-etchable portion to at least one radial etching boundary and at least one axial etching boundary to produce an optical structure, wherein the radial and axial etching boundaries comprise a material having a second etching rate, wherein the second etching rate is lower than the first etching rate when exposed to an etching medium
wherein the etching produces at least two radial openings and a void, and the void extends radially inward towards a field interaction region.

17. A method of manufacturing an optical device, comprising:
providing a structure-forming fiber bonded to at least one other optical component, the structure-forming fiber comprising a preferentially-etchable portion having a first etching rate; and
etching the preferentially-etchable portion to at least one radial etching boundary and at least one axial etching boundary to produce an optical structure, wherein the radial and axial etching boundaries comprise a material having a second etching rate, wherein the second etching rate is lower than the first etching rate when exposed to an etching medium
wherein the etching produces at least two radial openings and a void, and the void extends axially between end surfaces of a first lead-in fiber and a second lead-in fiber.

18. A method of manufacturing an optical device, comprising:
providing a structure-forming member including a preferentially-etchable portion, a radial etching boundary and an axial etching boundary; and
etching the structure-forming member with an etching medium to remove the preferentially-etchable portion to the radial and axial etching boundary through one or more radial openings, wherein the one or more radial openings extend from an inner cladding in the structure-forming member to an outer surface of the structure-forming member.

19. A method of manufacturing an optical device, comprising:
providing a structure-forming fiber bonded to a first optical component on a first end and a second optical component on a second end, the structure-forming fiber having a preferentially-etchable portion, the structure-forming fiber including at least one radial etching boundary comprising a structure-forming portion, and at least two axial etching boundaries at the first and second optical components; and
etching the preferentially-etchable portion to the at least one radial etching boundary and the at least two axial etching boundaries to produce an optical structure.

* * * * *